US012749294B2

(12) United States Patent
Koh et al.

(10) Patent No.: US 12,749,294 B2
(45) Date of Patent: Sep. 29, 2026

(54) AI BASED DEFECT DETECTION FOR NON-DESTRUCTIVE INSPECTION

(71) Applicant: THE BOEING COMPANY, Arlington, VA (US)

(72) Inventors: Hee Kyung Koh, Goyang (KR); Juhyeong Yun, Seoul (KR); Jung-Hyun Oh, Seongnam (KR)

(73) Assignee: The Boeing Company, Arlington, VA (US)

( * ) Notice: Subject to any disclaimer, the term of this patent is extended or adjusted under 35 U.S.C. 154(b) by 264 days.

(21) Appl. No.: 18/420,685

(22) Filed: Jan. 23, 2024

(65) Prior Publication Data

US 2025/0239054 A1 Jul. 24, 2025

(51) Int. Cl.

| | |
|---|---|
| ***G06T 7/11*** | (2017.01) |
| ***G06T 5/60*** | (2024.01) |
| ***G06T 5/70*** | (2024.01) |
| ***G06T 7/00*** | (2017.01) |
| ***G06V 10/762*** | (2022.01) |
| ***G06V 10/774*** | (2022.01) |

(Continued)

(52) U.S. Cl.

CPC .............. *G06V 10/774* (2022.01); *G06T 5/60* (2024.01); *G06T 5/70* (2024.01); *G06T 7/0002* (2013.01); *G06T 7/11* (2017.01); *G06V 10/762* (2022.01); *G06V 10/776* (2022.01); *G06T 2207/10132* (2013.01); *G06T 2207/20021* (2013.01); *G06T 2207/20076* (2013.01); *G06T 2207/20081* (2013.01); *G06T 2207/20084* (2013.01); *G06V 10/7715* (2022.01)

(58) Field of Classification Search

CPC .. G06V 10/774; G06V 10/762; G06V 10/776; G06V 10/7715; G06V 10/30; G06V 10/40; G06V 10/765; G06V 10/82; G06T 5/60; G06T 5/70; G06T 7/0002; G06T 7/11; G06T 2207/10132; G06T 2207/20021; G06T 2207/20076; G06T 2207/20081; G06T 2207/20084; G06T 7/74; G06T 2207/30164; G06T 7/001; G06T 7/0004; G06N 3/0464; G06N 3/048; G06N 3/088

USPC ........................................................ 382/159

See application file for complete search history.

(56) References Cited

U.S. PATENT DOCUMENTS

| | | | |
|---|---|---|---|
| 10,467,502 | B2 | 11/2019 | Ren et al. |
| 11,225,039 | B2 | 1/2022 | Choi et al. |

(Continued)

OTHER PUBLICATIONS

Roth et al. "Towards Total Recall in Industrial Anomaly Detection"—CVPR 2022 (Year: 2022).*

(Continued)

*Primary Examiner* — Stephen P Coleman

(74) *Attorney, Agent, or Firm* — Harrity & Harrity, LLP

(57) ABSTRACT

The present disclosure provides methods and techniques for anomaly detecting using feature matching models. A plurality of normal images are received. A plurality of patch features are generated by processing each of the plurality of normal images. A coreset comprising one or more coreset samples is generated, where the one or more coreset samples are selected from the plurality of patch features. A test image is received. One or more test patch features are generated by processing the test image. An anomaly score is generated by comparing the one or more test patch features with the one or more coreset samples.

20 Claims, 10 Drawing Sheets

(51) Int. Cl.

| | |
|---|---|
| ***G06V 10/776*** | (2022.01) |
| *G06V 10/77* | (2022.01) |

(56) References Cited

U.S. PATENT DOCUMENTS

| | | | | |
|---|---|---|---|---|
| 11,809,517 | B1 * | 11/2023 | Wen | G06F 17/10 |
| 2021/0364472 | A1 | 11/2021 | Jack et al. | |
| 2022/0244194 | A1 | 8/2022 | Perron et al. | |
| 2022/0392056 | A1 | 12/2022 | Sawal et al. | |

OTHER PUBLICATIONS

Roth, et al. "Towards total recall in industrial anomaly detection." Proceedings of the IEEE/CVF Conference on CVPR, 2022, pp. 14318-14328.

Cordier, et al. "Data refinement for fully unsupervised visual inspection using pre-trained networks", arXiv preprint, 2022.

Jiang et al., "SoftPatch: Unsupervised Anomaly Detection with Noisy Data", 36th Conference on Neural Information Processing Systems (NeurIPS 2022).

Niu et al., "DefectGAN: Weakly-supervised defect detection using generative adversarial network", IEEE 15th International Conference on Automation Science and Engineering (CASE), 2019.

LOF: <https://en.wikipedia.org/wiki/Local_outlier_factor>.

Kobyzev et al., Normalizing Flows: An Introduction and Review of Current Methods, IEEE Transactions on Pattern Analysis and Machine Intelligence, Jun. 6, 2020.

Almanza, M., et al., "k-Clustering with Fair Outliers", Proceedings of the ACM Conference on Embedded Networked Sensor Systems, ACMPUB27, New York, USA, Feb. 11, 2022, pp. 5-15, XP059948265, DOI: 10.1145/3488560.3498485, ISBN: 979-8-4007-0014-9.

Extended European Search Report for European Application No. EP25150435.3 dated Jun. 5, 2025, 9 pages.

Roth, K., et al., "Towards Total Recall in Industrial Anomaly Detection", IEEE/CVF Conference on Computer Vision and Pattern Recognition (CVPR), IEEE, Jun. 18, 2022, pp. 14298-14308, XP034194000, DOI: 10.1109/CVPR52688.2022.01392 [retrieved on Sep. 27, 2022].

* cited by examiner

AI BASED DEFECT DETECTION FOR NON-DESTRUCTIVE INSPECTION

FIELD

Aspects of the present disclosure relate to anomaly detection, and, more specifically, to performing image-based anomaly detection using feature matching models.

BACKGROUND

Early identification of defects in equipment or components is important for ensuring the safety and reliability of airline operations. Non-Destructive Inspection (NDI) is one preferred method for this purpose since it may evaluate a component's properties without causing any damage to the original part. For example, when inspecting a component within an aircraft, such as the wing panel, NDI techniques may deploy ultrasonic waves into the component to detect faults within the material.

SUMMARY

The present disclosure provides a method in one aspect, the method including receiving a plurality of normal images, generating a plurality of patch features by processing each of the plurality of normal images, generating a coreset comprising one or more coreset samples, where the one or more coreset samples are selected from the plurality of patch features, receiving a test image, generating one or more test patch features by processing the test image, and generating an anomaly score by comparing the one or more test patch features with the one or more coreset samples.

Other aspects of this disclosure provide one or more non-transitory computer-readable media containing, in any combination, computer program code that, when executed by the operation of a computer system, performs operations in accordance with one or more of the above methods, as well as systems comprising one or more computer processors and one or more memories containing computer-executable instructions that, when executed by the one or more computer processors, perform operations in accordance with one or more of the above methods.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

To facilitate understanding, identical reference numerals have been used, where possible, to designate identical elements that are common to the figures. It is contemplated that elements disclosed in one aspect may be beneficially used in other aspects without specific recitation.

DETAILED DESCRIPTION

The present disclosure relates to anomaly detection, and more specifically, to detecting anomalies using models trained with a feature matching approach.

Many non-destructive inspection (NDI) techniques produce a vast amount of highly complex data that is challenging to evaluate. For example, ultrasonic techniques may generate images or other visual representations about the internal structure of a component, but faults or other concerns within such data are often difficult or impossible to visually detect. The present disclosure provides methods and techniques for detecting anomalies in images obtained from NDI scanning or other similar techniques.

In some aspects, before performing anomaly detection on test images, feature matching techniques may be incorporated to pre-train a model for anomaly detection using a normal dataset. As used herein, the normal dataset may consist of images (or other visual representations) obtained through NDI or other scanning methods that depict a component without any defects. The pre-training may ensure that the model establish a clear baseline of what constitutes a "normal" state for the component, allowing the model to distinguish anomalies within the test images more efficiently and accurately. In some aspects, to further improve the accuracy and reliability of the anomaly detection models, noisy data within the normal dataset may be identified and removed early in the training process. The present disclosure introduces methods and techniques for denoising normal dataset, either at the image level, the patch level, or both, before incorporating feature matching techniques for pretraining the anomaly detection models. By implementing the two-tiered denoising process, in some aspects, the anomaly detection model can capture the inherent patterns or characteristics of the normal dataset more accurately, and thus improve the model's efficiency and precision in detecting anomalies.

Figure 1:
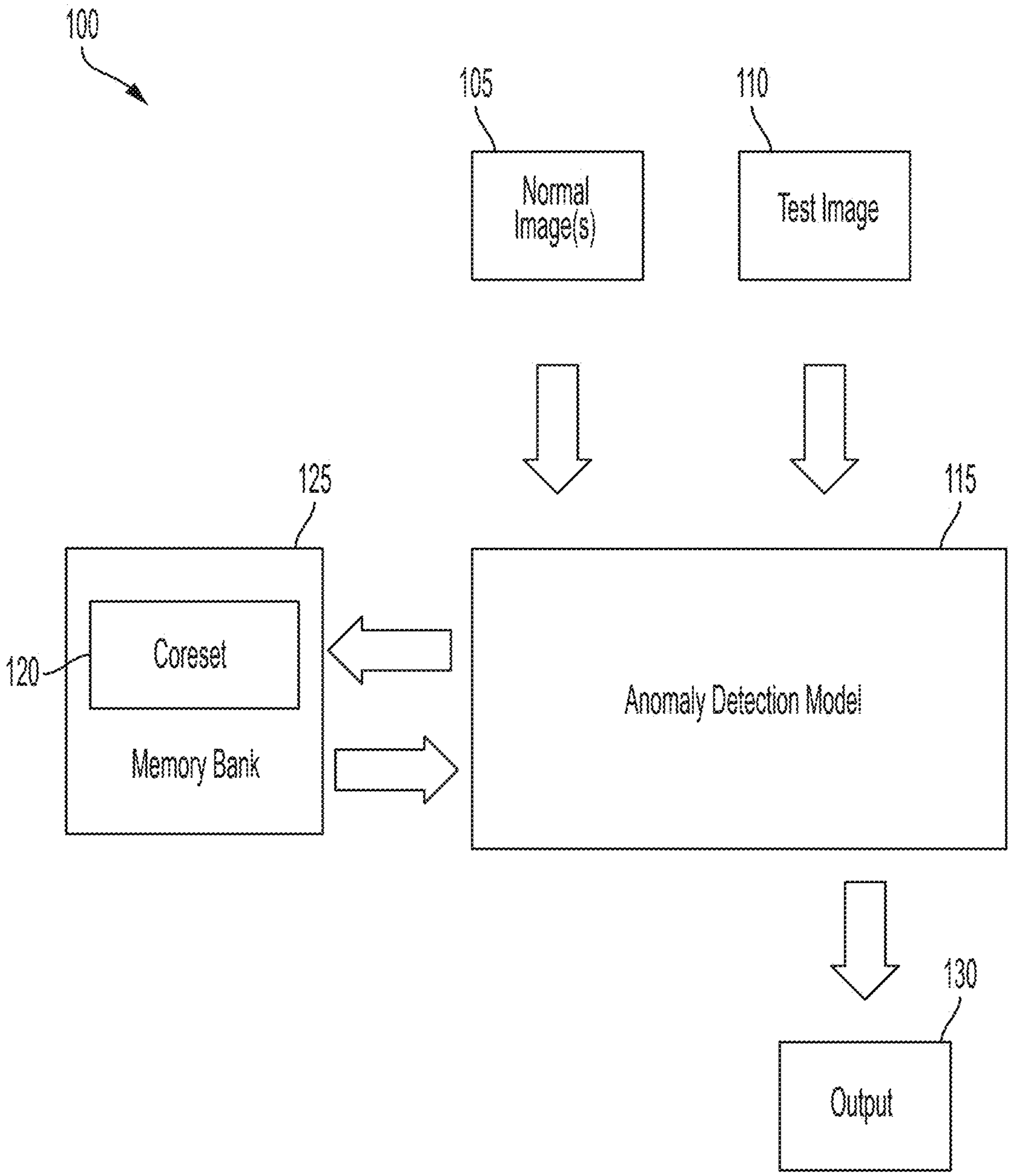
FIG. 1 depicts an example workflow for the operation of an anomaly detection model, according to some aspects of the present disclosure.

FIG. 1 depicts an example workflow 100 for the operation of an anomaly detection model, according to some aspects of the present disclosure.

In the illustrated example, a set of normal images 105 (e.g., depicting a standard or normal aircraft wing panel or other component without defects) are provided to an anomaly detection model 115 for pretraining. Upon receiving the normal images 105, the model 115 performs feature extraction to generate a coreset 120. In some aspects, the coreset 120 may comprise one or more coreset samples selected from a large collection of patch features extracted from normal images. Each patch feature may capture specific patterns and/or characteristics of the normal images. These coreset samples may be selected based on their representativeness and significance within the overall normal dataset, and may serve as baselines for anomaly detection. As illustrated, the coreset 120 is stored in a memory bank 125 or a database, and can be quickly accessed by the anomaly detection model 115 when a test image is received.

In the illustrated example, a test image 110 (e.g., depicting an aircraft wing panel with potential defects) is introduced for inspection. The anomaly detection model 115 processes the test image 110, extracting patch features from the image and comparing them to the coreset 120 stored in the memory bank 125. The anomaly detection model 115 then identifies the nearest coreset samples aligned with the test patch features. Based on the degree of deviation/dissimilarity between the test patch features and the nearest coreset samples, the anomaly detection model 115 determines the likelihood of the presence of anomalies within the test image (e.g., cracks or corrosions in the wing panel). The deviation may be measured by various distance metrics, such as Euclidean distance or cosine similarity, or other predefined criteria. In some aspects, the larger the deviation, the higher the likelihood that the test image is abnormal and/or contains anomalies.

As illustrated, the anomaly detection model 115 generates anomaly outputs 130 for the test image. In some aspects, the anomaly outputs 130 may include a determination indicating whether the test image 110 is normal (e.g., the wing panel within the test image is normal) or contains anomalies (e.g., the wing panel within the test image has defects). In some aspects, the anomaly outputs 130 may also include an anomaly score, which quantifies the likelihood that the test image contains or depicts anomalies. In some aspects, the anomaly outputs 130 may include a visual representation of the test image (e.g., a heat map), with different colors highlighting areas with varying likelihood of containing anomalies. For example, areas, patches, and/or pixels with a high likelihood of containing anomalies may be highlighted in red, whereas areas, patches, and/or pixels with a moderate likelihood of containing anomalies may be highlighted in green or yellow, and areas, patches, and/or pixels with a low likelihood of containing anomalies may be highlighted in blue.

In some aspects, the normal images 105 and the test image 110 (e.g., for an aircraft wing panel) may be generated using advanced techniques such as Non-Destructive Inspection (NDI). When NDI is used to inspect a component (e.g., an aircraft wing panel or an aircraft engine), ultrasonic waves may be emitted by a testing component. As these ultrasonic waves travel through the component, they may interact with the internal structures or materials of the component. For example, the ultrasonic waves may be reflected, refracted, or absorbed by the internal structures or materials. Based on the received signals (received by the testing component or by a different component), images (e.g., normal images 105 and test image 110) depicting or representing the internal structure of the component may be generated. The received signals may refer to the returning ultrasonic waves following the interactions with the internal structures or materials. Variations in the received signals, which may be caused by inconsistencies or potential defects (e.g., cracks, corrosions, deformations) within the components, may be reflected as visual variances in these images.

Figure 3A:
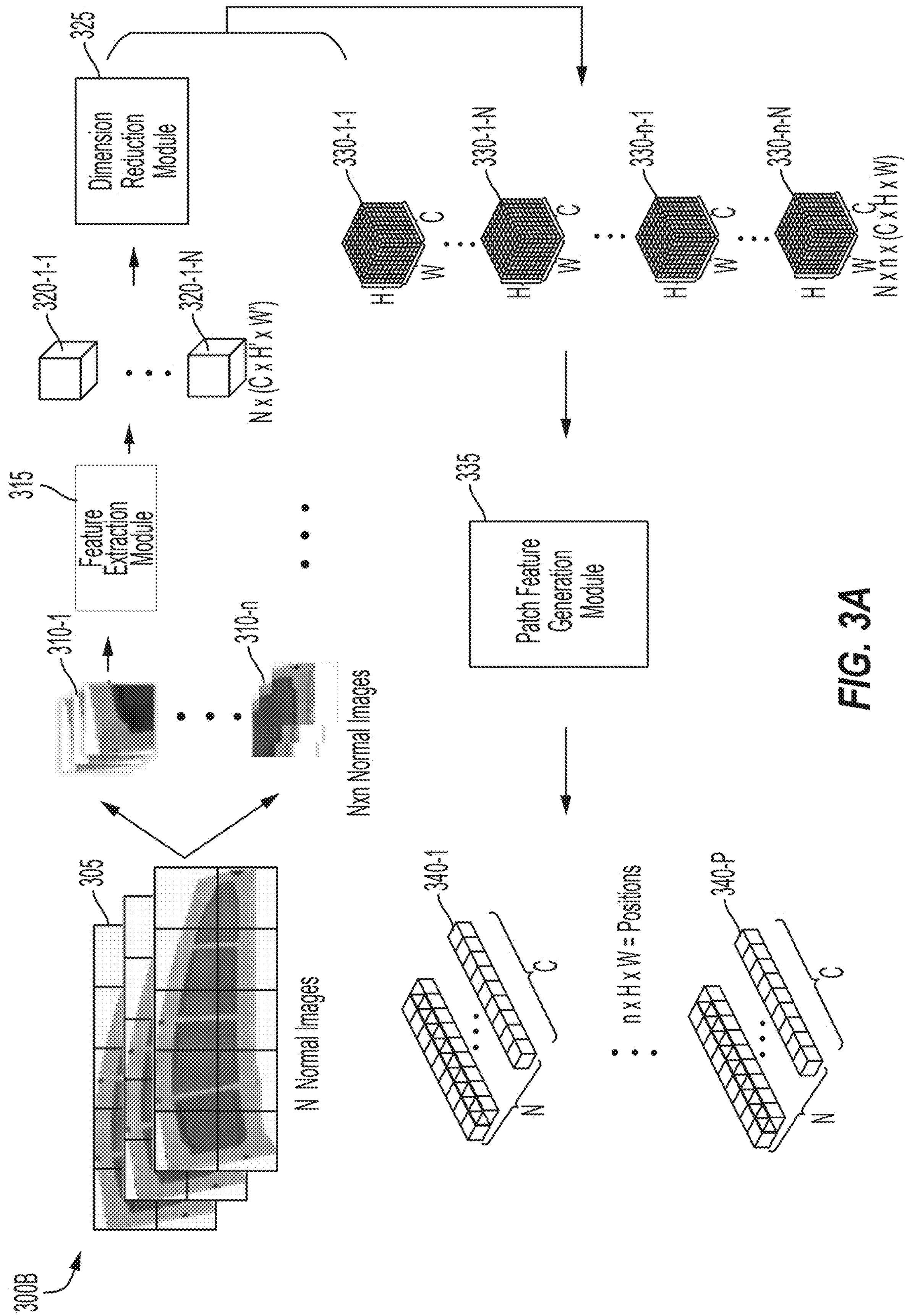
FIGS. 3A-3B depict an example workflow for patch-level noise elimination, according to some aspects of the present disclosure.
Figure 3B:
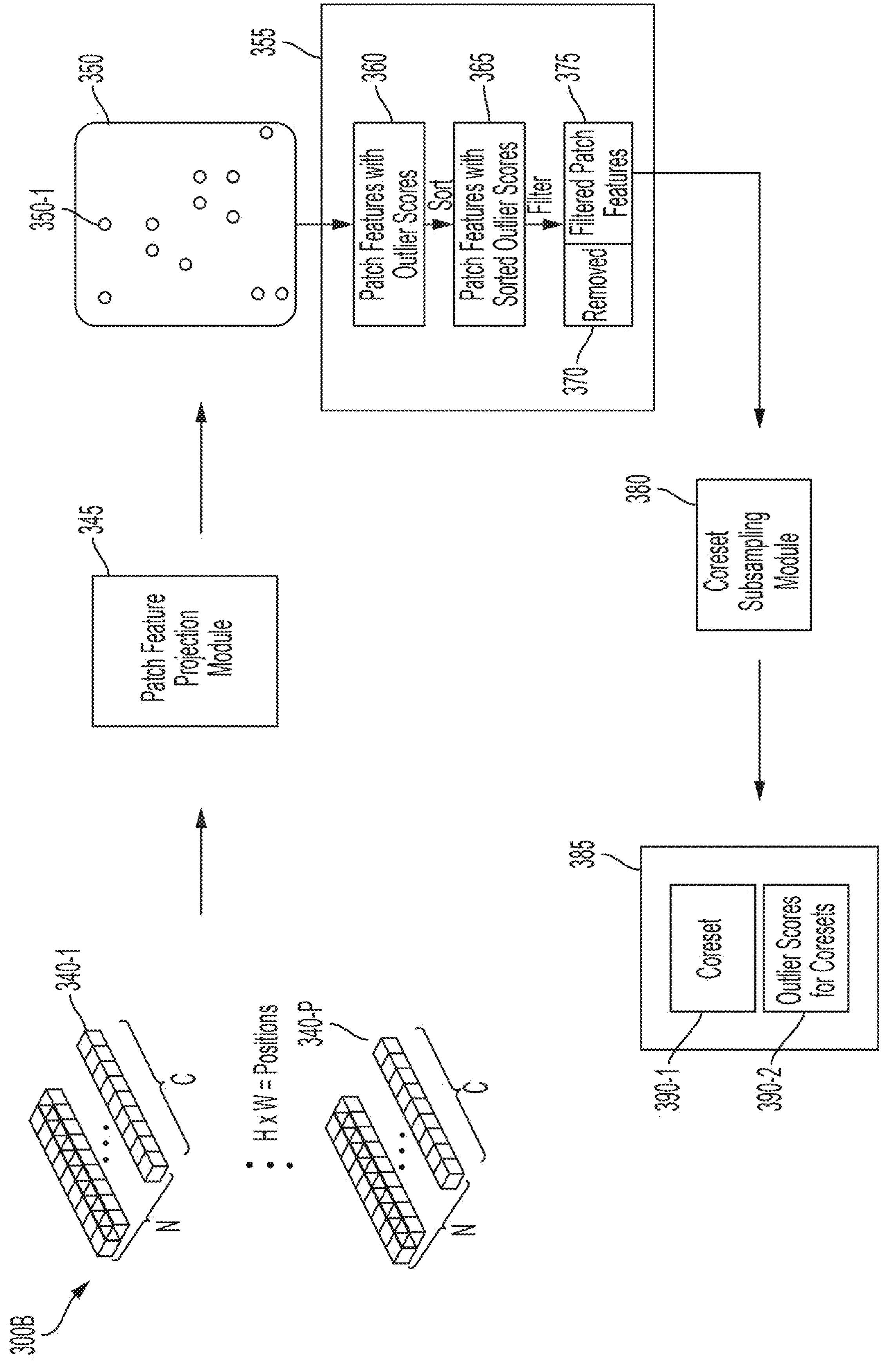
Figure 4:
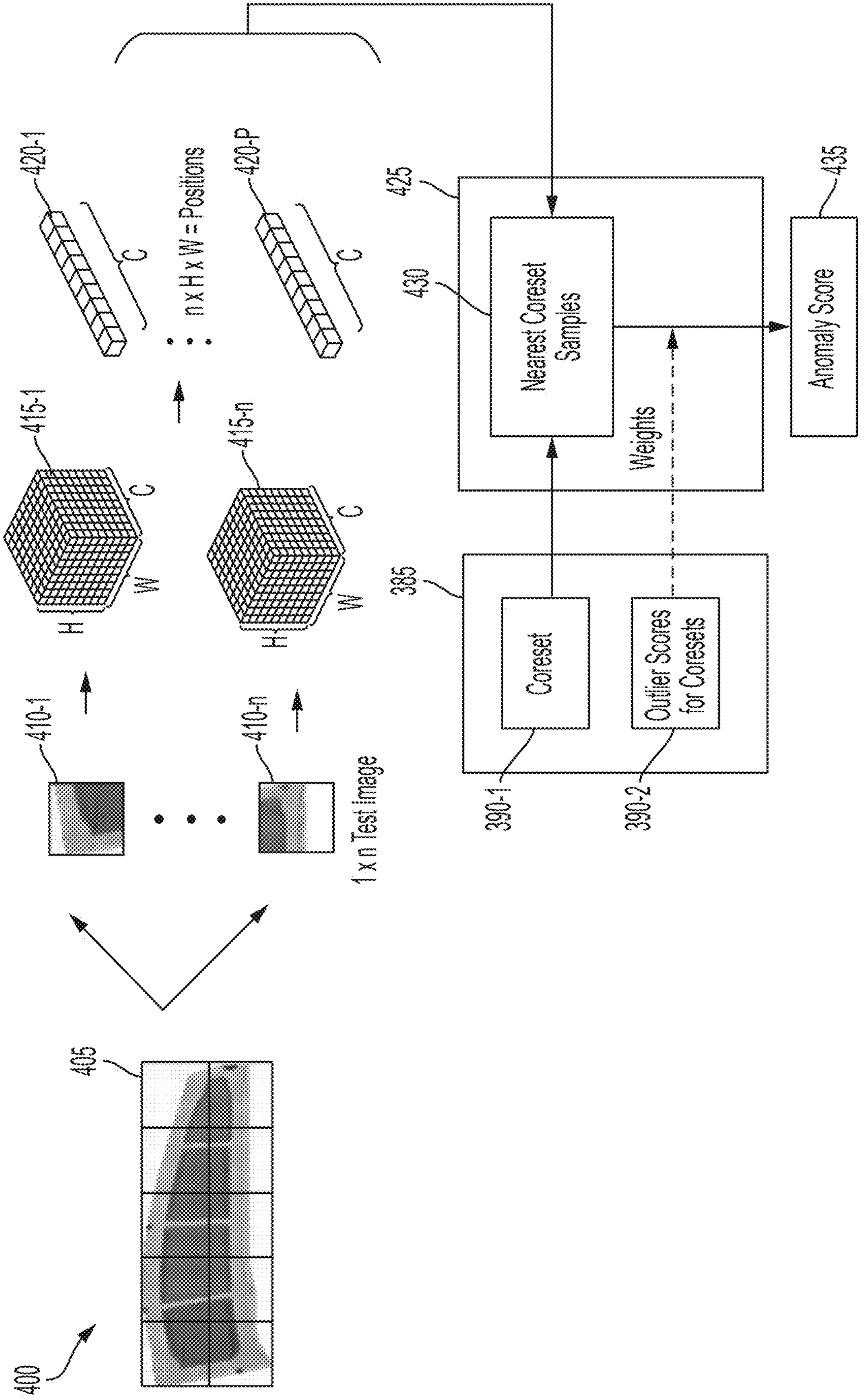
FIG. 4 depicts an example workflow for anomaly detection for a test image, according to some aspects of the present disclosure.

The anomaly detection model 115 may include various computing modules, each configured for a different task, such as the feature extraction module 315 of FIG. 3A, the dimension reduction module 325 of FIG. 3A, the patch feature generation module 335 of FIG. 3A, the patch feature projection module 345 of FIG. 3B, the patch feature denoising module 355 of FIG. 3B, the coreset subsampling module 380, and the nearest neighbor search module 425 of FIG. 4. More detail is discussed below with reference to FIGS. 3A-3B, and 4. Although depicted as discrete modules or components for conceptual clarity, in some aspects, the operations of the depicted modules or components (and others not depicted) may be combined or distributed across any number and variety of modules, and may be implemented using hardware, software, or a combination of hardware and software.

Figure 2:
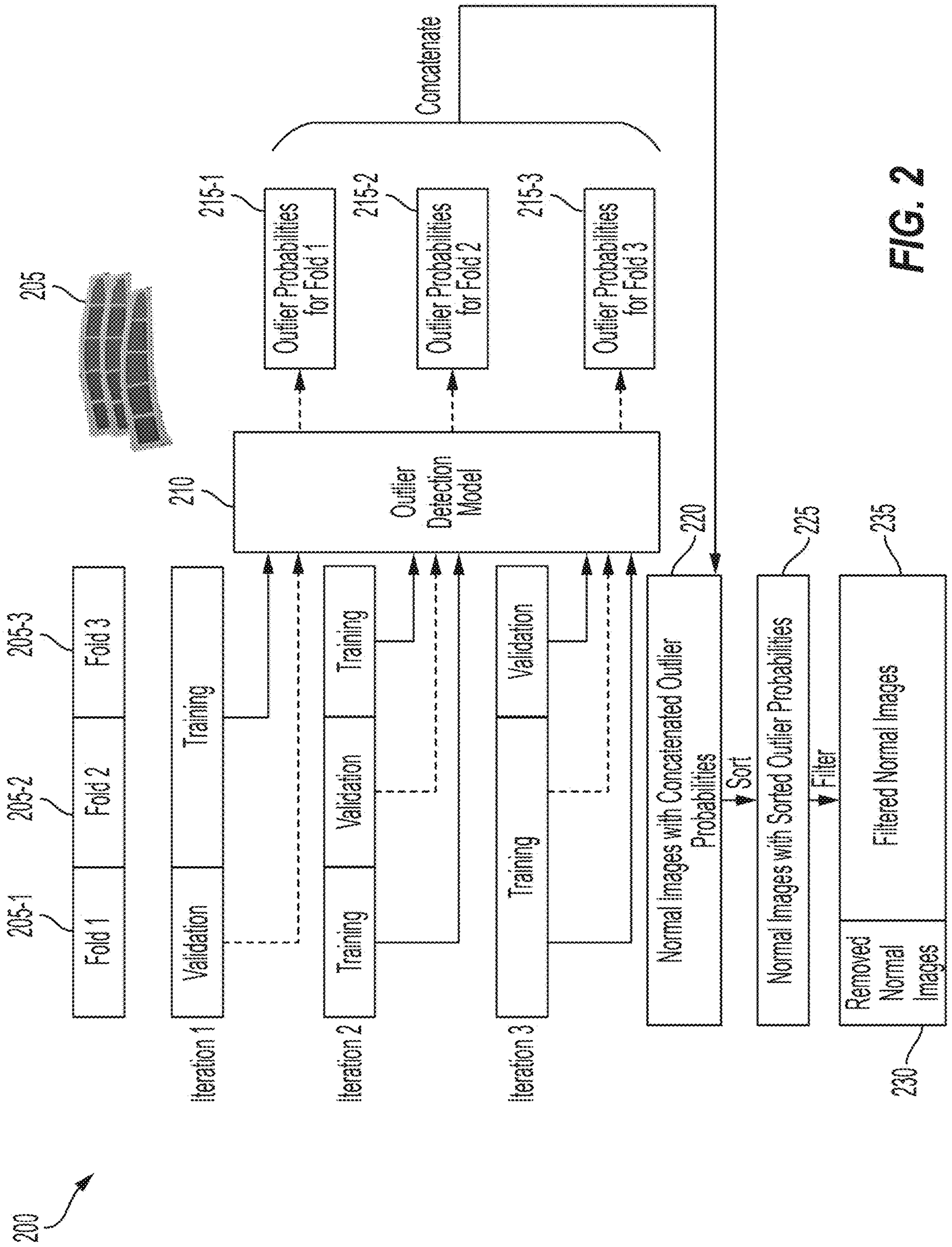
FIG. 2 depicts an example workflow for image-level noise elimination, according to some aspects of the present disclosure.
Figure 9:
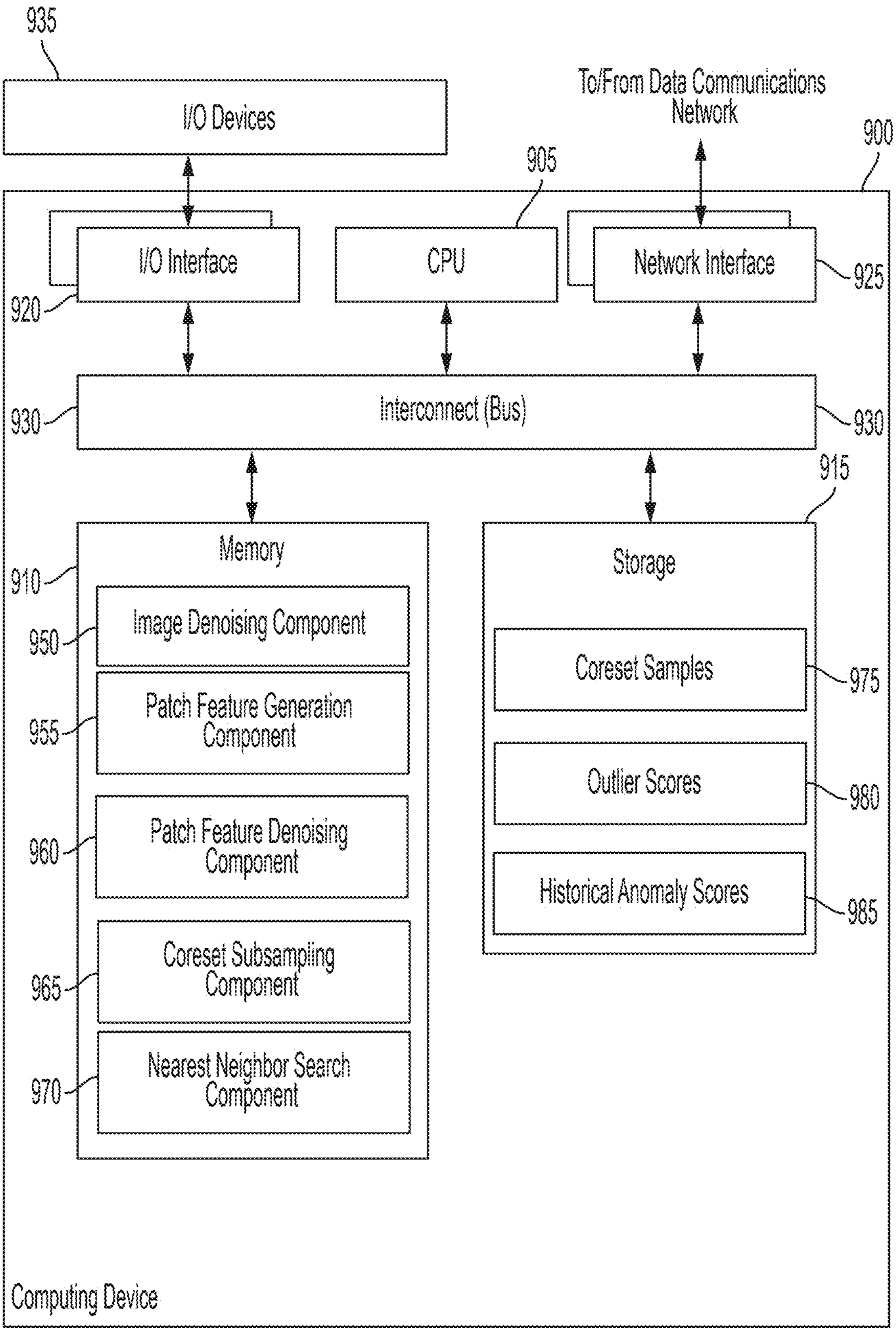
FIG. 9 depicts an example computing device configured to perform various aspects of the present disclosure, according to one aspect.

FIG. 2 depicts an example workflow 200 for image-level noise elimination, according to some aspects of the present disclosure. In some aspects, the workflow 200 may be performed by one or more computing devices, such as the anomaly detection model 115 as illustrated in FIG. 1, and/or the computing device 900 as illustrated in FIG. 9.

In the illustrated example, a plurality of normal images 205 are received for pretraining an anomaly detection model (e.g., 115 of FIG. 1). As illustrated, the normal images 205 depict a standard/normal aircraft wing panel. In some aspects, before applying the normal images 205 to pretrain the anomaly detection model, image-level noise elimination may be performed. This step may filter out potentially ambiguous or anomalous images, and therefore improve the quality and reliability of the normal dataset for further processing (e.g., generating patch features or coreset samples).

As illustrated, the image-level denoising begins by dividing the normal images 205 into three folds or groups, 205-1, 205-2, and 205-3. Each fold contains an equal number of images. The three folds of normal images are then used for cross-validation.

In the first iteration of the cross-validation process, fold 1 (205-1) is assigned as the validation dataset, and fold 2 (205-2) and fold 3 (205-3) are grouped together as the training dataset. During the first iteration, fold 2 and fold 3 are provided to train the outlier detection model 210 (e.g., PaDim). During the training phase, the model 210 assumes that the images within the training dataset are normal, and learns the common patterns and features from these images. Once the training phase ends, the trained outlier detection model 210 is deployed to process the images from fold 1 within the validation dataset. During the validation phase, the trained model 210 compares the patterns and features of a test image (e.g., from fold 1 in the validation dataset) with what it has learned from the training dataset. Based on the comparison, the model 210 generates an outlier probability (also referred to in some aspects as an outlier probability score) for each image within the validation dataset. The value of the outlier probability indicates how likely an image deviates from what the model learns as normal based on the training dataset. A high outlier probability (e.g., above a defined threshold) may suggest that the image may be ambiguous or potentially anomalous. At the end of the first iteration, a set of outlier probabilities 215-1 for images in fold 1 is generated.

As illustrated, in the second iteration of the cross-validation process, fold 1 (205-1) and fold 3 (205-3) are combined as the training dataset, and fold 2 (205-2) is designated as the validation dataset. Following a similar procedure as the first iteration, the outlier detection model 210 is trained on the images from fold 1 and fold 3. The model 210, again, learns the patterns and features from the training dataset, and recognize them as "normal" patterns for outlier detection. During the validation phase, the trained model 210 processes each image from fold 2 (205-2), and assign an outlier probability to each image based on its deviation from the learned normal patterns. A set of outlier probabilities 215-2 for the images in fold 2 is generated at the end of the second iteration.

In the third iteration, fold 1 (205-1) and fold 2 (205-2) are aggregated and assigned as the training dataset, and fold 3 (205-3) is set as the validation dataset. The outlier detection model 210 is trained with the combined images from fold 1 and fold 2, and then deployed on the images from fold 3 to generate a set of outlier probabilities 215-3. With the third iteration complete, the outlier probabilities for each image in all three folds (e.g., 205-1, 205-2 and 205-3) have been generated.

The illustrated example, which divides the normal images into three groups or folds, is provided merely for conceptual clarity. In some aspects, the normal images may be divided into any number (e.g., N) of folds or groups. The cross-validation process may be iterated any number (e.g., N) of times to obtain a full list of outlier probabilities for all images within the normal dataset.

In the illustrated example, following the cross-validation process, the outlier probabilities 215-1, 215-2 and 215-3 from all three iterations are concatenated into a single list 220. The list 220 includes all images from the normal dataset 205 and their corresponding outlier probabilities. The images are then arranged in descending order based on their outlier probabilities, where those with the highest outlier probabilities are placed at the front of the sorted list 225.

In the illustrated example, an established criteria is applied to the sorted list 225, in order to filter out noisy data from the normal dataset. For example, in some aspects, the criteria may instruct the removal of the top n % of images with the highest outlier probabilities (e.g., 230). The value n can be adjusted based on specific requirements of the denoising system, the quality and characteristics of the normal dataset, and other relevant factors. By applying the criteria, images that are most likely to be ambiguous or potentially anomalous are removed. The remaining images 235 are then provided for subsequent pretraining of the anomaly detection model. In some aspects, the system may set a threshold for the outlier probability. Images whose probabilities are equal to or exceed the threshold (e.g., 230) may be removed from further processing.

FIGS. 3A-3B depict an example workflow for patch-level noise elimination, according to some aspects of the present disclosure. In some aspects, the workflow 300A of FIG. 3A and workflow 300B of FIG. 3B (collectively, forming a workflow 300) may be performed by one or more computing devices, such as the anomaly detection model 115 as illustrated in FIG. 1, and/or the computing device 900 as illustrated in FIG. 9.

In the illustrated example, a dataset of normal images 305 (which may correspond to the filtered normal images 235 of FIG. 2) are received. As illustrated, the normal images 305 depict a standard/normal aircraft wing panel. The training dataset comprises N normal images 305, and may have been filtered to exclude images with higher outlier probabilities, as discussed above. Each of the N normal images 305 is divided into n subsections or patches (e.g., from 310-1 to **310-*n***). As a result, a total of (N×n) segmented images are produced. In some aspects, the segmentation can be performed by dividing each image into a grid of equal-size sections or patches to ensure uniform coverage of the features within each image. In some aspects, the size and number of these patches may be determined randomly, considering the unique characteristics of each image. The image segmentation may ensure a more localized analysis of each image's features. In some aspects, the segmented image has a dimension of (3×H'×W'), where H' represents the heights in pixels, W' represents the width in pixels, and 3 represents the number of color channels in the image.

In the illustrated example, the segmented images (e.g., 310-1) are passed through a feature extraction module 315 to extract high-dimensional feature maps (e.g., from 320-1-1 to 320-1-N) with dimensions of (C×H'×W'). These high-dimensional feature maps are then processed by a dimension reduction module 325 to generate feature maps with a reduced dimension of (C×H×W) (where H is less than H' and/or W is less than W') (e.g., from 330-1-1 to 330-1-N). A total of (N×n) features maps 330 are generated for the normal dataset (e.g., from 330-1-1 to **330-*n*-N). In some aspects, the feature extraction module 315 may include one or more convolutional layers followed by activation functions (e.g., a convolutional neural network (CNN) or similar deep learning model), which are designed to capture hierarchical patterns and features within the normal images. In some aspects, the dimension reduction module 325** may include one or more pooling layers (e.g., max pooling or average pooling), which are configured to reduce the spatial dimensions of the feature maps derived from the normal images.

In the illustrated example, the feature maps 330 with reduced dimensionality are provided to a patch feature generation module 335, which compiles patch features for each position across the segmented images. Given that each feature map 330 contains (H×W) positions, and each of the N normal images is divided into n subsections, a total of (n×H×W) positions are identified. For each position within the normal images, a set of patch features (e.g., from 340-1 to 340-P) with a dimension of (N×C) is generated.

Turning to FIG. 3B, the patch feature sets (e.g., from 340-1 to 340-P) are then transmitted to a patch feature projection module 345, which projects each of the patch features (with a dimension of (1×C)) into a shared feature space 350. In the illustrated example, the projection are performed by pooling all sets (e.g., from 340-1 to 340-P) together, where patch features for all positions are projected collectively into the feature space 350. The projected patch features are then processed by a patch feature denoising module 355, where an outlier score is determined for each patch feature using a density-based approach (e.g., Local Outlier Factor (LOF)). Under the LOF approach, the patch feature denoising module 355 measures the local density around a data point 350-1 (also referred to in some embodiments as a projected patch feature), where the local density is determined by the distance from the data point 350-1 to its k-th nearest neighbor(s). This local density is then compared with the densities of the data point 350-1's neighbors, and a corresponding LOF score is generated. A LOF score significantly larger than 1 indicates that the data point 350-1 is in a sparser region compared to its neighbors and is thus considered an outlier. A LOF score that is closer to 1 represents that the data point 350-1 is in a region with a similar density to its neighbors. The higher the LOF score, the more likely the data point (or the projected patch feature) is to be an outlier.

In the illustrated example, the patch feature denoising module 355 aggregates the outlier scores for all patch features (from all sets 340) to create a list 360. The patch features are then sorted in descending order based on their corresponding outlier scores (e.g., depicted by the sorted list 365). A filter criteria is then applied on the list 365 to perform patch-level noise elimination. The criteria may be percentage-based (such as removing the top n % of patch features with the highest outlier scores) or threshold-based (such as removing patch features whose outlier scores are equal to or exceed a defined threshold). Following the implementation of the filter criteria, patch features 370 having higher outlier scores (e.g., that are more likely to be noisy) are removed, and the refined or filtered patch features 375 are then provided to a coreset subsampling module 380 for coreset selection.

In some aspects, instead of pooling the patch features from all sets together, the patch features may be projected individually for each set. For example, the patch feature projection module 345 may project the patch feature set (e.g., 340-1) for a specific position into a feature space 350, and an outlier score may be computed for each patch feature within the specific set (e.g., 340-1). Based on the sorted outlier scores, the patch feature denoising module 355 may apply a filter criteria to further refine the patch features within the specific set (e.g., 340-1). For example, the module 355 may remove the top n % of patch features with the highest scores within the set (e.g., 340-1). The process may be repeated for each set of patch features (e.g., from 340-1 to 340-P), to ensure each one is individually analyzed and denoised. In some aspects, an outlier in one set may be a normal feature in another given the varied characteristics of each set. By processing each set of patch features individually, the path feature denoising component 355 may focus on more localized noise elimination (e.g., denoising patch features for a specific position). This approach may improve the accuracy and efficacy of the noise removal process.

In the illustrated example, after the patch-level denoising, the refined or filtered patch features 375 are transmitted to a coreset subsampling module 380 for coreset selection. The coreset selection process aims to identify a subset of data points (or patch features) that can effectively and accurately represent the overall patterns or characteristics of the normal dataset (e.g., normal images 305). Various methods may be used for coreset selection, including but not limited to unsupervised machine learning (ML) models (e.g., k-means clustering) or greedy algorithms. In some aspects, such as when the k-means clustering model is utilized, the coreset subsampling module 380 may categorize the filtered patch features 375 into several clusters, and select the centroids of each respective cluster as the coreset samples.

In the illustrated example, the selected coreset samples (collectively referred to as a coreset 390-1), along with their corresponding outlier scores 390-2, are stored in a memory bank 385 (which may correspond to the memory bank 125 of FIG. 1). The memory bank 385 may serve as a repository for these representative patch features, which can be quickly retrieved for future comparisons and anomaly detections (e.g., when a test image is received).

FIG. 4 depicts an example workflow 400 for anomaly detection for a test image, according to some aspects of the present disclosure. In some aspects, the workflow 400 may be performed by one or more computing devices, such as the anomaly detection model 115 as illustrated in FIG. 1, and/or the computing device 900 as illustrated in FIG. 9.

In the illustrated example, a test image 405 is provided for inspection. As illustrated, the test image depicts an aircraft wing panel that may or may not have any defects (e.g., cracks, corrosions, deformations, holes, or punctures). The test image 406 is divided into multiple subsections or patches (e.g., from 410-1 to 410-*n*). In some aspects, the number of subsections in the test image corresponds to the number of subsections into which the normal images are divided. For example, if the normal images are segmented into 10 subsections, the test image may also be divided into 10 subsections for consistency in comparison. As illustrated, a total of (1×n) segmented test images are generated.

In the illustrated example, feature maps (e.g., from 415-1 to 415-*n*) for each of the segmented test images are generated. In some aspect, the segmented test images may first pass through a feature extraction module (e.g., 315 of FIG. 3A) (e.g., including one or more convolutional layers accompanied with activation functions), which identifies patterns and/or characteristics within the test image. The extracted patterns may then be processed by a dimension reduction module (e.g., 325 of FIG. 3A) (e.g., including one or more pooling layers) that condenses the patterns into a set of feature maps (e.g., from 415-1 to 415-*n*). As illustrated, each feature map corresponds to a segmented test image (e.g., the feature map 415-1 corresponds to the segmented test image 410-1, and the feature map 415-*n* corresponds to the segmented test image 410-*n*), and has a reduced dimensionality of (C×H×W). Given that the test image is divided into n segmented test images, a total of n feature maps are generated.

In the illustrated example, the test feature maps (e.g., from 415-1 to 415-*n*) are then provided to a patch feature generation module (e.g., 335 of FIG. 3A), which generates patch features for each position across the segmented test images. A total of (n×H×W) positions are identified considering that each test feature map 415 contains (H×W) positions, and the test image 405 is divided into n subsections. For each position within the test image, a patch feature (e.g., from 420-1 to 420-P) with a dimension of (1×C) is generated. The extracted patch features 420 are then provided to a nearest neighbor search module 425. The nearest neighbor search module 425 is communicatively coupled to the memory bank 385, which stores the coreset samples 390-1 extracted from normal dataset 305 during the pre-training phase. The nearest neighbor search module 425 searches through the memory bank 385 to identify the coreset samples 430 that are closest or nearest to these patch features 420.

In the illustrated example, after the nearest coreset samples 430 are identified for each patch features 420, the nearest neighbor search module 425 generates an anomaly score 435 for each subsection 410 and/or for the test image 405. For example, in some aspects, the module 425 may first compare each patch feature (e.g., 420-1) with its closest coreset sample (e.g., 430) to generate a distance (e.g., Euclidean distance or cosine similarity). For each patch feature 420, the distance may then be weighted by the outlier score 390-2 of its corresponding coreset sample. Following that, these weighted distances are then aggregated to produce the final anomaly score 435 for the test image 405. In some aspects, the anomaly score may range from 0 to 1. The higher the anomaly score, the higher the likelihood that test image contains anomalies (e.g., representing that the wing panel within the test image is abnormal and contains potential defects).

In some aspects, the anomaly score 435 may be compared with a defined threshold. If the anomaly score is equal to or exceeds the threshold, it suggests that the test image contains anomalies, and an inspection decision may be generated indicating that the wing panel within the test image is abnormal and/or contains potential defects. If the score falls below the threshold, it suggests that the test image is normal, and an inspection decision may be generated stating that wing panel with the test image is normal. In some aspects, upon determining that the test image 403 contains anomalies (e.g., the score surpasses the threshold), a visual representation of the test image may be generated with areas of concern highlighted (e.g., areas or patches with a high probability of containing anomalies are marked as red). These highlighted regions provide a clear and direct view of potential defect locations on the wing panel, and can help inspectors or relevant maintenance personnel to focus their attention on these specific areas for further evaluation and analysis.

Figure 5:
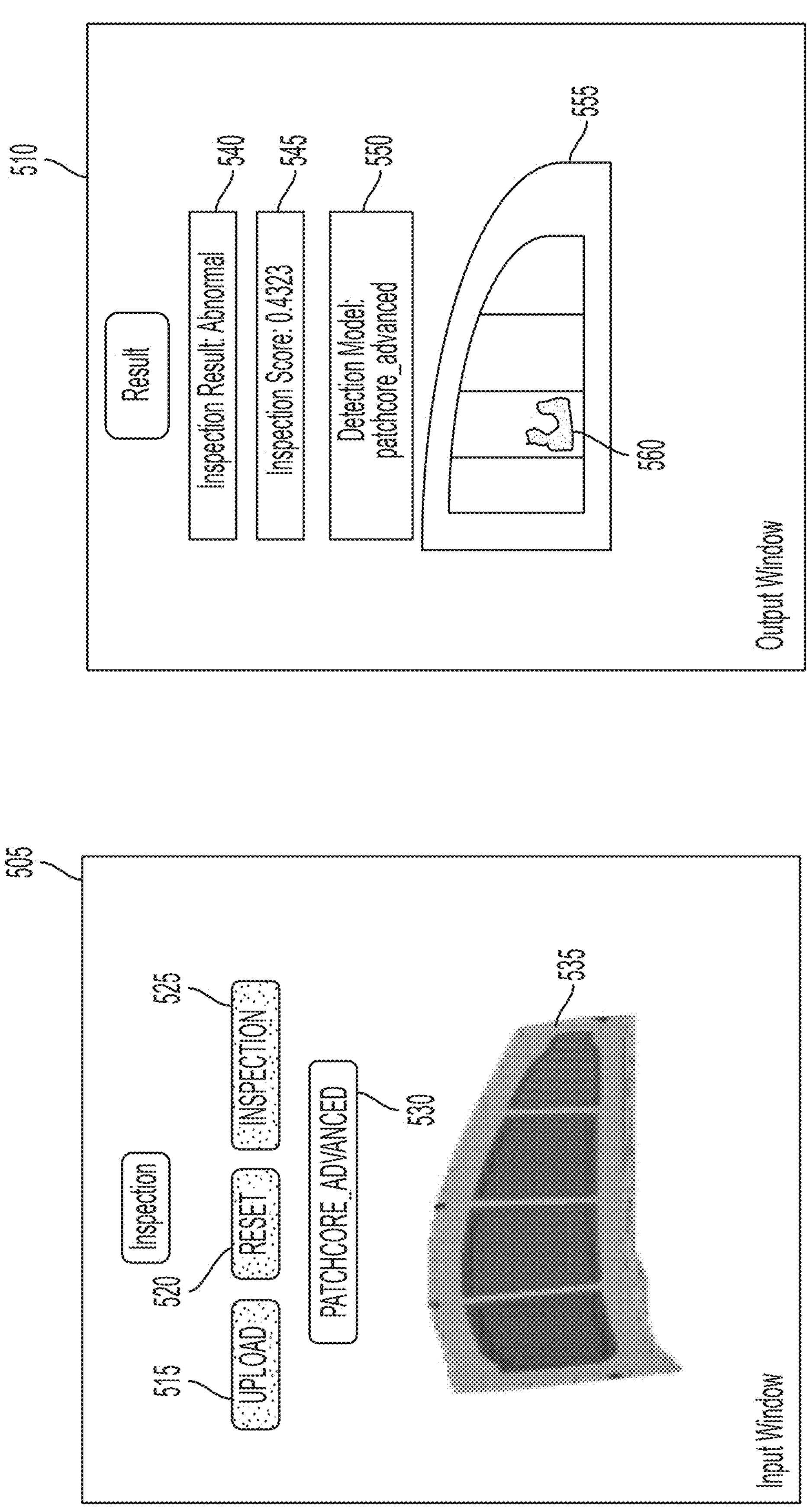
FIG. 5 depicts an example input window and output window of an anomaly detection model, according to some aspects of the present disclosure.

FIG. 5 depicts an example input window 505 and output window 510 of an anomaly detection model, according to some aspects of the present disclosure.

As illustrated, the input window 505 of the anomaly detection model provides a streamlined interface for users. The input window 505 includes an "Upload" button 515, a "Reset" button 520, and an "Inspection" button 525. The "Upload" button 515 allows users to upload their test images into the system. Once clicked, in some aspects, the system may open a file explorer window to choose the image file. Once a test image is uploaded, the image may be displayed within the input window (e.g., 535), which allows the users to visually confirm the image they have uploaded. Once the image is uploaded and confirmed, users may click on the "Inspection" button 525 to initiate the anomaly detection process. The results will be displayed in the output window 510. The "Reset" button 520 offers a simple way for users to clear the uploaded test images and any related results. Below the three buttons, the input window also includes a block 530 that displays the name or version of the model being used.

As illustrated, the output window 510 is designed to display the anomaly detection results to users. The first block 540 in the output window 510 is used to display the inspection result. For example, depending on the model's assessment, the block 540 may include text such as "Inspection Result: Abnormal" if anomalies are detected within the test image. If the test image is determined to be normal, the block 540 may include text such as "Inspection Result: Normal." The second block 545 in the output window 510 shows the anomaly score generated for the uploaded test image. For example, the second block 545 may include "Inspection Score: 0.4323." The anomaly score displayed within the second block 545 may provide users with a direct insight into the degree to which the test image deviates from the normal dataset. The third block 550 in the output window 510 displays the name or version of the model being used. Below the third block 550, the fourth block 555 displays the test image where areas with a high probability of containing anomalies 560 are highlighted. In some aspects, areas with varying probabilities within the test image may be highlighted using different colors. For example, areas with a high probability 560 may be marked in red, areas with a moderate probability may be colored green or yellow, and areas with a low probability may be colored blue.

In some aspects, users may upload multiple images collectively. For example, after clicking the "Upload" button 515 within the input window 505, a file explorer window is prompted, allowing users to choose a batch of images from their files. Depending on system capabilities, the uploaded images may be accessed and processed either sequentially (handling one image at a time), or in parallel (processing multiple images simultaneously). Once the processing is complete, in some aspects, the system may aggregate and display the final results collectively in the output window 510.

Figure 6:
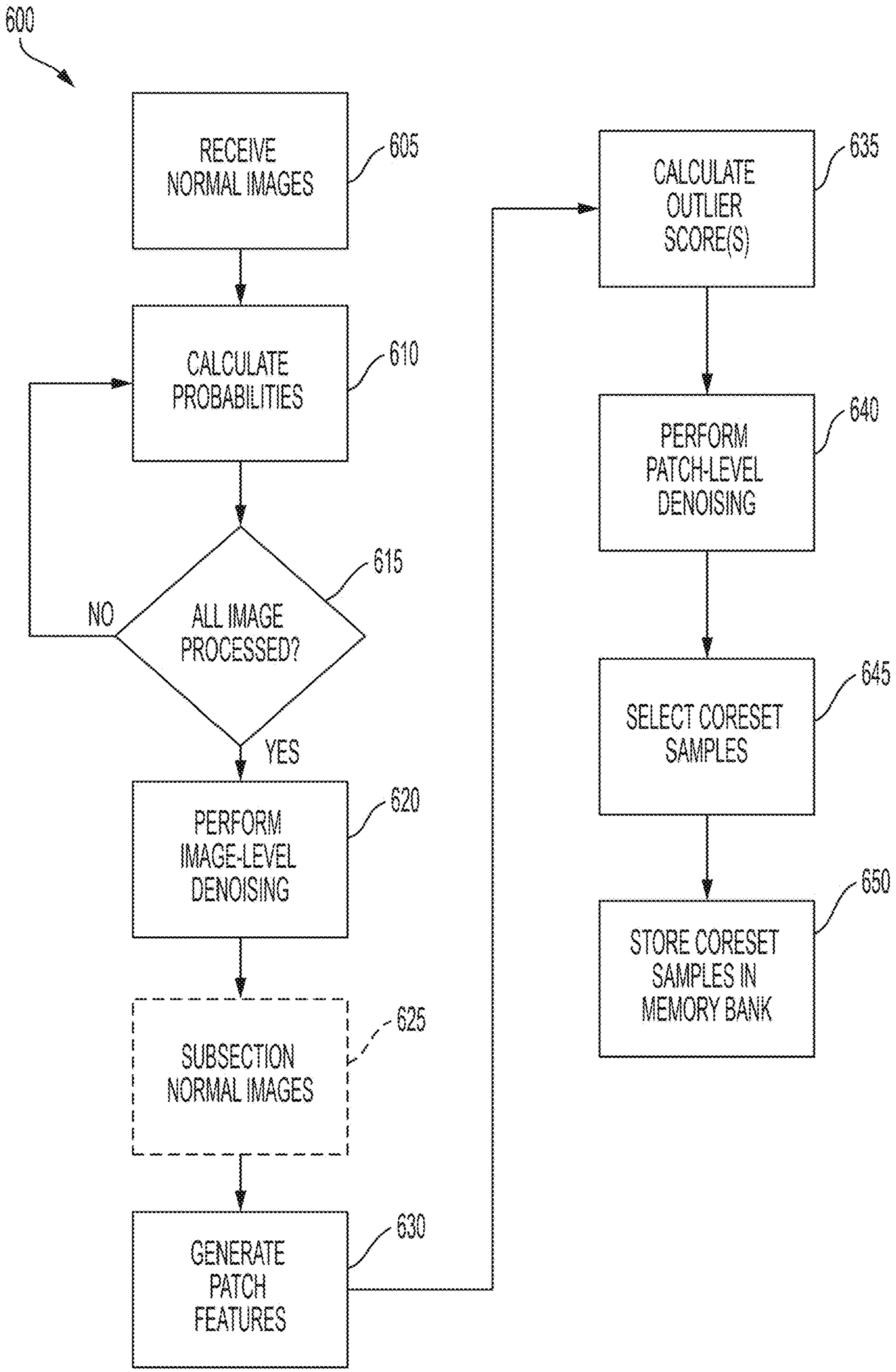
FIG. 6 depicts an example method for processing normal images to generate coreset samples for anomaly detection, according to some aspects of the present disclosure.

FIG. 6 depicts an example method 600 for processing normal images to generate coreset samples for anomaly detection, according to some aspects of the present disclosure. The example method 600 is designed to pretrain an anomaly detection model (e.g., 115 of FIG. 1) using the feature matching approach. Through the pretraining, the model learns, extracts, and identifies coreset samples that capture the most essential and representative patterns within the normal dataset. When a test image is received, the model can effectively compare the test image against these coreset samples for anomaly detection.

In some aspects, the example method 600 may be performed by one or more computing devices, such as the anomaly detection model 115 as illustrated in FIG. 1, the feature extraction module 315, the dimension reduction module 325, and the patch feature generation module 335 as illustrated in FIG. 3A, the patch feature projection module 345, and the coreset subsampling module 380 as illustrated in FIG. 3B, and/or the computing device 900 as illustrated in FIG. 9.

At block 605, a computing system (e.g., 115 of FIG. 1) receives a plurality of normal images (e.g., 205 of FIG. 2). In some aspects, the normal images may depict an object in its normal or standard state. In the context of aircraft inspection and maintenance, these normal images may be produced by NDI techniques, and capture the internal structure of a component or equipment (e.g., a wing panel or an aircraft engine) in its normal or defect-free conditions. These normal images may serve as the baselines for what constitute "normal", and the patch features extracted from the normal images may be used to compare against test images for anomaly detection. The normal images may be retrieved from a database, or sourced directly from user submissions through an input interface (e.g., the input window 505 of FIG. 5).

At block 610, the computing system evaluates each normal image (e.g., 205 of FIG. 2) to determine its likelihood of being ambiguous or noisy. In some aspects, the likelihood of being ambiguous may be measured by an outlier probability score (also referred to in some aspects as an outlier probability), which quantifies how likely a particular image deviates from a normal state (established based on other received normal images). A higher score may indicate that the image is more likely to be ambiguous or potentially anomalous compared with others. In some aspects, n-fold cross-validation may be performed to calculate the outlier probability score. For example, the entire dataset of the normal images (e.g., 205 of FIG. 2) may be divided into n (e.g., n=3) different subsets (e.g., 205-1, 205-2 and 205-3 of FIG. 2). The system may then iteratively train on (n−1) of these subsets (e.g., folds 205-2 and 205-3 are used for training the outlier detection model 210) and validate/test on the remaining subset (e.g., fold 205-1 is used for validation). The training cycle may be repeated n (e.g., n=3) times, each time with a different subset reserved for testing/validation. As a result, the outlier probability score is generated for each image within the dataset. The n-fold cross-validation offers every image the chances to be in both the training and testing subsets. The method may mitigate overfitting and ensure that the generated outlier probability scores are not biased toward any specific portion of the normal dataset.

At block 615, the computing system checks if every image within the received set of normal images (e.g., 205 of FIG. 2) has been processed and a corresponding outlier probability score has been generated. If the system determines that all images have been processed, the method 600 proceeds to block 620. If the system determines that some images remain unprocessed, the method 600 returns to block 610, where the system evaluates the omitted images and generates corresponding outlier probability scores.

At block 620, the computing system performs image-level denoising based on the generated outlier probability scores for images within the received normal dataset. In some aspects, the computing system may first arrange the images according to their outlier probability scores in descending order. Images with relatively high scores may be placed at the front of the list (e.g., 225 of FIG. 2), while images with relatively low scores may be placed at the end of the list. After the images are sorted, the system may apply a filter criteria, such as excluding the top n % of images with the highest outlier probability scores, to remove images that are most likely to be noisy or ambiguous. In some aspects, the system may define a threshold for the outlier probability score. Upon determining that an image's score is equal to or above the threshold, the system may remove the image. The threshold and the value may be adjusted depending on various factors, such as the size of the normal dataset, the quality of the images within the normal dataset, and the accuracy and/or efficiency requirements of the anomaly detection model, and others.

At block 625, after image-level denoising, the cleaned or refined normal images (e.g., 235 of FIG. 2, or 305 of FIG. 3) are segmented into smaller sections (e.g., from 310-1 to **310-*n***). The segmentation is optional and may benefit the system when the normal images are in a large size or include a broad range of details that more granular and localized analysis becomes necessary. In some aspects, such as when the normal images depict an aircraft wing panel, the segmentation may isolate individual slots of the wing for more detailed feature extraction.

At block 630, the computing system processes the refined normal images (e.g., 305 of FIG. 3A) to extract patch features (e.g., from 340-1 to 340-P of FIG. 3A). In some aspects, the computing system may first pass the normal images or segmented images through a feature extraction module (e.g., 315 of FIG. 3A). The module (e.g., which consists of convolutional layers followed by activation functions) may aid the system to identify various spatial features or characteristics within the normal images. The output of the module may be a set of feature maps with the dimension of (C×H'×W') (e.g., from 320-1-1 to 320-1-N of FIG. 3A). To further improve computational efficiency, the set of feature maps may then be provided to a dimension reduction module (e.g., which consists of pooling layers) (e.g., 325 of FIG. 3A) to condense the data, yielding feature maps with the reduced dimension of (C×H×W) (where H is less than H' and/or W is less than W') (e.g., from 330-1-1 to **330-*n*-N of FIG. 3A). Following the dimension reduction, the system then segments these reduced feature maps into patch features. Since multiple normal images are processed (e.g., N normal images are received), for each position within the reduced-dimension feature maps, a corresponding path feature set is generated (e.g., from 340-1 to 340-P of FIG. 3A) with the dimension of (N×C). Each patch feature set may capture the localized features or characteristics of the normal images at a specific position. In some aspects, the system may project each patch feature set individually into a respective feature space, which allows the system to perform noise elimination within each set. In some aspects, the system may pool all patch features from all sets collectively and project them into a single and shared feature space (e.g., 350 of FIG. 3**B). This approach may enable the system to analyze the collective patterns of all patch features, and perform more globalized noise elimination.

At block 635, the computing system calculates outlier scores for each patch feature using a density-based approach (e.g., LOF). The LOF algorithm measures the local density deviation of a patch feature from its neighbors. A LOF score for a patch feature that is significantly larger than 1 suggests that this patch feature is in a sparser region (within the feature space) compared to its neighbors, which may indicate that the patch is an outlier. In contrast, a LOF score that is closer to 1 indicates that the patch feature has a similar density to its surrounding neighbors. After the calculation, each patch feature is associated with a respective outlier score that represents its deviation from the norm.

At block 640, the computing system performs patch-level denoising. In some aspects, the computing system may first sort all patch features in descending order based on their corresponding outlier scores. Patch features at the front of the ordered list (e.g., 365 of FIG. 3B) have the highest outlier scores. Following the rearrangement, the computing system may apply a defined filter criteria to the sorted list, where patch features that meet or exceed the criteria may be removed from further processing. The filter criteria may be predefined based on historical data, the accuracy and efficiency requirements of the anomaly detection model, or the nature of the patch feature dataset. As discussed above, in some aspects, the filter criteria may be percentage-based, such as eliminating the top n % of patch features with the highest outlier scores. In some aspects, the filter criteria may be threshold-based, where a threshold for the outlier scores is defined, and images whose outlier scores are equal to or above the threshold are removed. The patch-level denoising allows the system to discard patch features that are most likely to be outliers (or ambiguous), and therefore mitigate the risk of being misled by noisy data during the subsequent anomaly detection when a test image is received.

At block 645, the denoised patch features (e.g., 375 of FIG. 3B) are provided for coreset subsampling, where the computing system identifies a subset of patch features that are most representative and capture the overall patterns or characteristics of the normal dataset. The subset of patch features selected during the coreset subsampling may also be referred to as a coreset (e.g., 390-1), and the patch features within the subset may also be referred to as coreset samples. In some aspects, the system may use the k-means clustering algorithms to classify the denoised patch features into multiple clusters, and identify the centroids of each respective cluster as the coreset samples.

At block 650, the computing system saves the identified coreset samples (e.g., 390-1 of FIG. 3B) in a memory bank or database (e.g., 385 of FIG. 3B). These coreset samples may serve as baselines for future anomaly detection when evaluating new test images. In some aspects, the outlier scores for the identified coreset samples (e.g., 390-2) may also be saved into the memory bank or database, which can be used to weight the final anomaly scores (e.g., 435 of FIG. 4) generated for the new test images.

Figure 7:
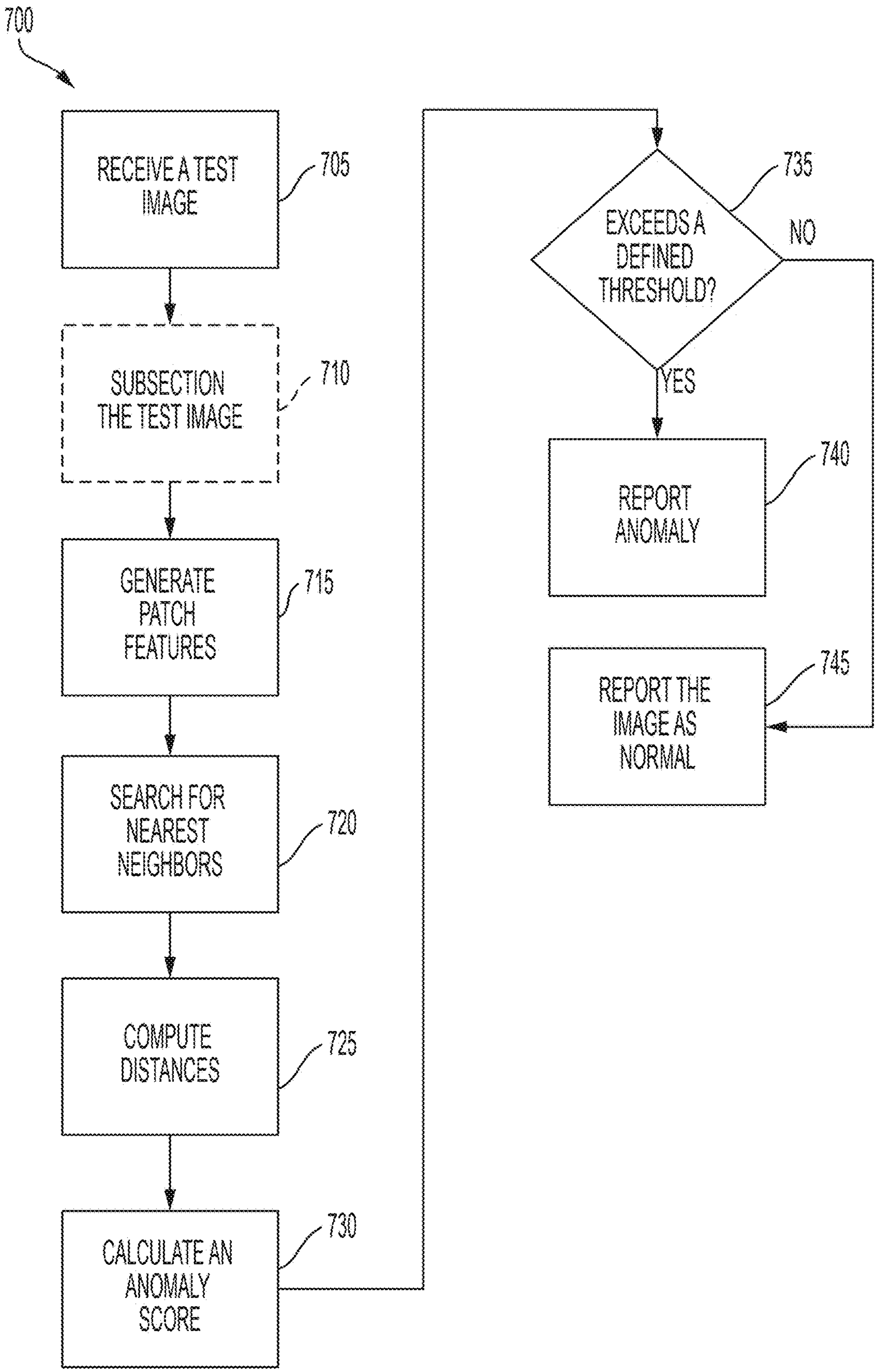
FIG. 7 depicts an example method for detecting anomalies in a test image using generated coreset samples, according to some aspects of the present disclosure.

FIG. 7 depicts an example method 700 for detecting anomalies in a test image using generated coreset samples, according to some aspects of the present disclosure. The example method 700 is designed for model inference, where the pretrained anomaly detection model (e.g., 115 of FIG. 1) processes a new test image and performs anomaly detection by comparing the test image against the coreset samples (which are generated during the pretraining process).

In some aspects, the example method 700 may be performed by one or more computing devices, such as the anomaly detection model 115 as illustrated in FIG. 1, the feature extraction module 315, the dimension reduction module 325, and the patch feature generation module 335 as illustrated in FIG. 3A, the patch feature projection module 345 as illustrated in FIG. 3B, the nearest neighbor search module 425 as illustrated in FIG. 4, and/or the computing device 900 as illustrated in FIG. 9.

At block 705, a computing system (e.g., 115 of FIG. 1) receives a test image (e.g., 405 of FIG. 4). In some aspects, the test image (e.g., 405 of FIG. 4) may depict an aircraft wing panel that has potential defects.

At block 710, the computing system divides the test image into multiple sections (e.g., from 410-1 to **410-*n***). The segmentation is optional and may allow the system to perform more granular and localized anomaly detection by assessing each smaller section of the test image independently. In some aspects, the test image may be divided in the same manner and into the same number of sections as the normal images during the pretraining phase. By doing so, it may ensure consistency in the subsequent feature extraction and nearest neighbor search processes.

At block 715, the computing system extracts patch features from the test image. For example, in some aspects, the computing system may first pass the test image or its segmented sections through a feature extraction module (e.g., 315 of FIG. 3A) to extract high-dimension feature maps. These feature maps capture the unique spatial patterns and/or characteristics within the test image. To simplify computation, the system may then reduce the dimensionality of these feature maps via a dimension reduction module (e.g., 325 of FIG. 3A). Once the dimension reduction is complete, the system may divide these reduced-dimension feature maps (with the dimension of (C×H×W)) (e.g., from 415-1 to **415-*n* of FIG. 4) into patch features (e.g., from 420-1 to 420-P of FIG. 4**). For each position within the reduced-dimension feature map (e.g., a total of (n×H×W) positions), a corresponding path feature (with the dimension of (1×C)) is generated. The patch features include local spatial information and may be used for comparison with coreset samples for anomaly detection.

At block 720, the computing system accesses the memory bank (e.g., 385 of FIG. 4) that contains the coreset samples (e.g., 390-1 of FIG. 4) identified during the pretraining process. For each patch feature derived from the test image, the system searches for the nearest or closest coreset sample (e.g., 430 of FIG. 4) within the memory bank.

At block 725, for each patch feature, the computing system computes the distance between the feature and its nearest coreset sample. Various distance metrics, such as Euclidean distance or cosine similarity, may be used based on the specific implementation.

At block 730, the computing system aggregates the computed distances and generates an anomaly score (e.g., 435 of FIG. 4) for the test image. In some aspects, the distance between each patch feature and its nearest coreset sample may be weighted by the coreset sample's outlier score (e.g., LOF score) (e.g., 390-2 of FIG. 4). The weighting mechanism incorporates the outlier scores into the anomaly detection, making the anomaly score not only a measure of raw deviation but also adjusted by the importance and/or reliability of each coreset sample. Under the weighting approach, patch features extracted from the test image are not treated equally. Instead, the influence of patch features with a higher outlier score (that is more representative) may be enhanced, and the influence of patch features with a lower outlier score (that is less representative) may be reduced.

At block 735, the computing system compares the anomaly score (e.g., 435 of FIG. 4) of the test image with a defined threshold. The threshold may determine the sensitivity of the anomaly detection model. If the anomaly score is equal to or exceeds the threshold, the method 700 proceeds to block 740, where the system classifies the test image as abnormal (or containing anomalies). In some embodiments, an associated result may be generated to report the anomaly (e.g., 540 of FIG. 5). In some aspects, following the determination, a detailed report or visual representation (e.g., 555 of FIG. 5) may be generated to highlight the anomalous sections. If the anomaly score is below the threshold, the method 700 proceeds to block 745, where the system determines the test image as normal. In some aspects, a result may be generated to report the normal status, indicating the absence of detectable anomalies.

Figure 8:
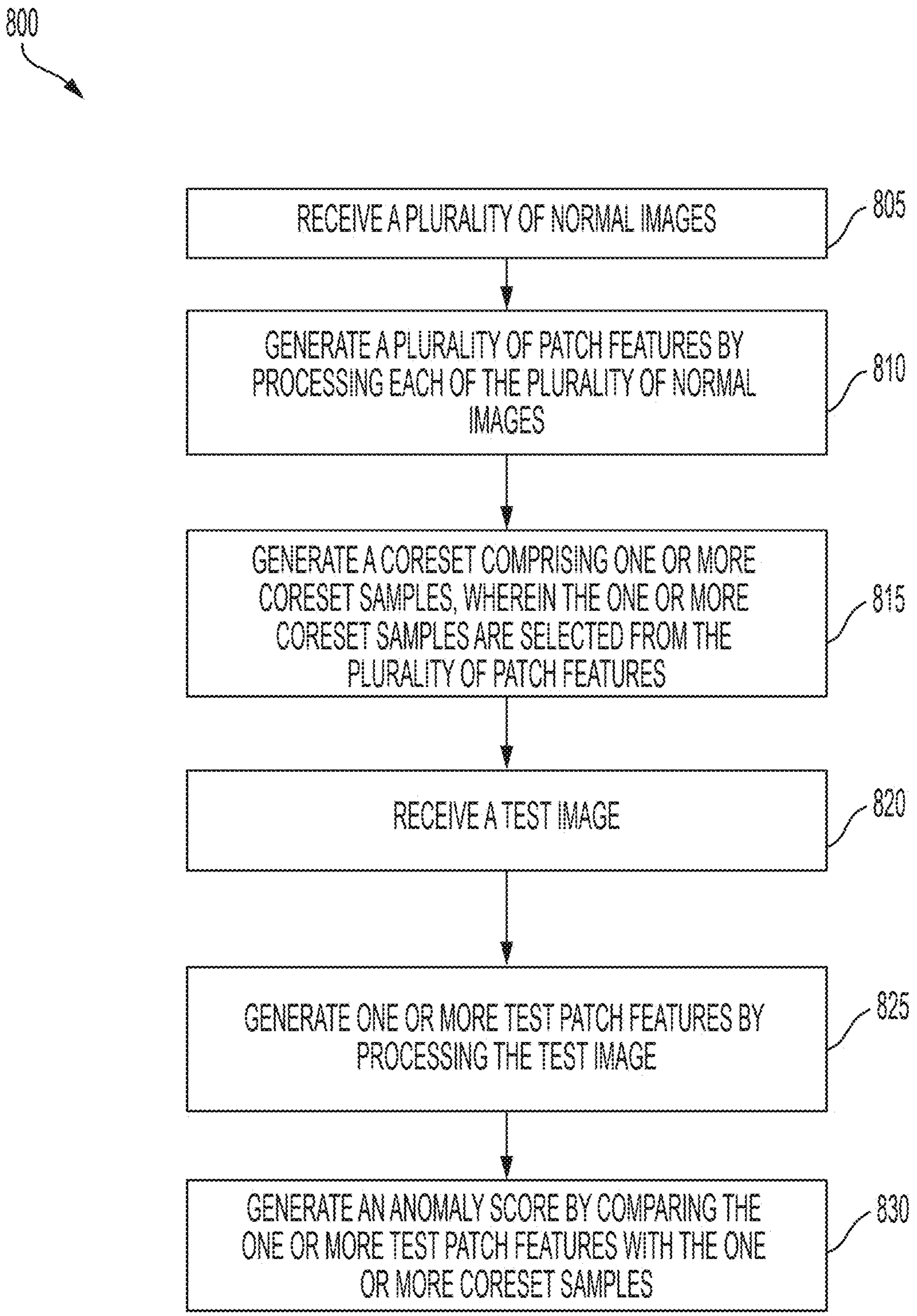
FIG. 8 is a flow diagram depicting an example method for pretraining an anomaly detection model, according to some aspects of the present disclosure

FIG. 8 is a flow diagram depicting an example method 800 for pretraining an anomaly detection model, according to some aspects of the present disclosure.

At block 805, a computing system (e.g., 115 of FIG. 1) receives a plurality of normal images (e.g., 205 of FIG. 2 or 305 of FIG. 3A).

At block 810, the computing system generates a plurality of patch features (e.g., 340 of FIG. 3A) by processing each of the plurality of normal images.

At block 815, the computing system generates a coreset (e.g., 390-1 of FIG. 3B) comprising one or more coreset samples, where the one or more coreset samples are selected from the plurality of patch features (e.g., 340 of FIG. 3B).

At block 820, the computing system receives a test image (e.g., 405 of FIG. 4).

At block 825, the computing system generates one or more test patch features (e.g., 420 of FIG. 4) by processing the test image.

At block 830, the computing system generates an anomaly score (e.g., 435 of FIG. 4) by comparing the one or more test patch features (e.g., 420 of FIG. 4) with the one or more coreset samples.

In some aspects, the computing system may further divide each of the plurality of normal images (e.g., 305 of FIG. 3A) into a plurality of sections (e.g., 310 of FIG. 3A), where each section of the plurality of sections comprises a sub-region of a normal image within the plurality of normal images.

In some aspects, the computing system may further generate an outlier probability for each of the plurality of normal images, comprising dividing the plurality of normal images into a plurality of groups (e.g., 205-1, 205-2, and 205-3 of FIG. 2), where each group comprises an equal number of the normal images, designating a first group (e.g., 205-1 of FIG. 2) of the plurality of groups as a validation dataset, and remaining groups (e.g., 205-2 and 205-3) of the plurality of groups as a training dataset, training an outlier detection model (e.g., 210 of FIG. 2) on the training dataset (e.g., 205-2 and 205-3), and generating the outlier probability for each image within the validation dataset (e.g., 205-1 of FIG. 2) based on a validation performed by the trained outlier detection model.

In some aspects, the computing system may, upon determining that one or more normal images from the plurality of normal images have outlier probabilities that meet a first criteria, generate a subset of normal images (e.g., 235 of FIG. 2) by removing the one or more normal images (e.g., 230 of FIG. 2) from the plurality of normal images, generate the plurality of patch features (e.g., 340 of FIG. 3A) by processing each of the subset of normal images, calculate an outlier score for each patch feature within the plurality of patch features, and, upon determining one or more patch features from the plurality of patch features having the outlier scores that meet a second criteria, create a subset of patch features (e.g., 375 of FIG. 3B) by removing the one or more patch features (e.g., 370 of FIG. 3B) from the plurality of patch features, and selected the one or more coreset samples within the coreset from the subset of patch features (e.g., 375 of FIG. 3B). In some aspects, the outlier score for each of the plurality of patch features may be calculated using a density-based method. In some aspects, the density-based method may evaluate a local density deviation of a patch feature with respect to a neighboring patch feature within the plurality of patch features, and the outlier score for the patch feature may be determined based on the local density deviation.

In some aspects, each respective coreset sample, within the one or more coreset samples, may be stored into a database (e.g., 385 of FIG. 3B) along with a respective outlier score (e.g., 390-2 of FIG. 3B). In some aspects, the one or more coreset samples may be selected from the plurality of patch features (e.g., 340 of FIG. 3B) using a clustering model. In some aspects, the clustering model may divide the plurality of patch features into one or more clusters, and the one or more coreset samples may comprise centroids within the one or more clusters. In some aspects, the anomaly score (e.g., 435 of FIG. 4) may be weighted by outlier scores (e.g., 390-2 of FIG. 4) associated with the one or more coreset samples.

In some aspects, the computing system may further divide the test image (e.g., 405 of FIG. 4) into a plurality of test sections (e.g., 410 of FIG. 4), wherein each of the plurality of test sections corresponds to a respective section within each of the plurality of normal images.

FIG. 9 depicts an example computing device 900 configured to perform various aspects of the present disclosure, according to one aspect. Although depicted as a physical device, in some aspects, the computing device 900 may be implemented using virtual device(s), and/or across a number of devices (e.g., in a cloud environment). The computing device 900 may comprise the anomaly detection model 115 as illustrated in FIG. 1.

As illustrated, the computing device 900 includes a CPU 905, memory 910, storage 915, one or more network interfaces 925, and one or more I/O interfaces 920. In the illustrated aspect, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included as being representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated aspect, the memory 910 includes an image denoising component 950, a patch feature generation component 955, a patch feature denoising component 960, a coreset subsampling component 965, and a nearest neighbor search component 970. Although depicted as a discrete component for conceptual clarity, in some aspects, the operations of the depicted component (and others not illustrated) may be combined or distributed across any number of components. Further, although depicted as software residing in memory 910, in some aspects, the operations of the depicted components (and others not illustrated) may be implemented using hardware, software, or a combination of hardware and software.

In the illustrated aspect, the image denoising component 950 is configured to remove noisy images from the received normal dataset before they are provided for pretraining an anomaly detection model (e.g., 115 of FIG. 1). In some aspects, the image denoising component 950 may generate outlier probabilities (also referred to in some aspects as outlier probability scores) for each normal image (e.g., 205 of FIG. 2) through a n-fold cross-validation process. For example, the image denoising component 950 may first divide the normal dataset into several groups or folds (e.g., n folds) (e.g., 205-1, 205-2 and 205-3 of FIG. 2), each group containing an equal number of normal images. For each iteration, one of these groups may be chosen as the validation dataset, while the remaining groups may serve as the training dataset. The image denoising component 950 may comprise an outlier detection model (e.g., 210 of FIG. 2) that is trained on the training dataset, and then validated on the validation dataset to compute outlier probabilities. The computation may be repeated several times (e.g., n times) until every image in the normal dataset is associated with an outlier probability. Following that, the image denoising component 950 may rank the images in descending order based on their associated outlier probabilities. To filter out noisy images, the component 950 may apply an established criteria to the sorted list, such as removing the top n % of images with the highest probabilities or eliminating images whose probabilities exceed a defined threshold.

In the illustrated example, the patch feature generation component 955 is configured to process the received images (e.g., normal images 305 of FIG. 3A or test images 405 of FIG. 4) and generate corresponding patch features. For example, in some aspects, the patch feature generation component 955 may extract high-dimensional feature maps (e.g., 320-1-1 and 320-1-N of FIG. 3A) by passing through the images through convolutional layers, which are deployed to identify spatial hierarchies and patterns within the images. After the feature extraction, the component 950 may then proceed to reduce the dimensionality of these feature maps using pooling layers. Following the dimensionality reduction, the component 950 may segment the refined feature maps (e.g., 330-1-1 of FIG. 3A, or 415-1 of FIG. 4) into patch features (e.g., 340-1 of FIG. 3A, or 420-1 of FIG. 4), where each patch feature corresponds to a specific position within the image and represents localized patterns or characteristics of the image at that position.

In the illustrated example, the patch feature denoising component 960 is designed to further refine the patch features extracted from the normal images (e.g., by removing noisy patch features) before they are provided for coreset subsampling. In some aspects, before performing denoising, the patch feature denoising component 960 may first generate an outlier score for each patch feature using a density-based method (e.g., LOF). With the LOF approach, the patch feature denoising component 960 may first project the patch features into a shared feature space (e.g., 350 of FIG. 3B), where the outlier score for a given patch feature is calculated based on its local density deviation in comparison to neighboring patch features. In some aspects, the local density may be determined by the distance between a patch feature and its k-th nearest neighbor in the feature space. After the outlier scores have been determined for all patch features, the component 960 may proceed to rank the patch features in descending order based on their scores (e.g., 365 of FIG. 3B), and apply a determined criteria to filter out patch features that might be misleading for anomaly detection (e.g., 370 of FIG. 3B). In some aspects, the criteria may be set to exclude the top n % of patch features with the highest outlier scores. In some aspects, the criteria may be defined as removing any patch feature whose outlier score exceeds a defined threshold.

In the illustrated aspect, the coreset subsampling component 965 selects coreset samples from the refined set of patch features (e.g., 375 of FIG. 3B). In some aspects, these coreset samples may capture the most representative patterns or characteristics of the normal dataset, and may act as baselines for anomaly detection when processing new test images. The coreset samples and their related outlier scores may be saved in the storage 915 or a remote database (e.g., 125 of FIG. 1).

In the illustrated aspect, the nearest neighbor search component 970 is configured to measure the similarity between a test image (received during model inference) (e.g., 405 of FIG. 4) and one or more normal images (received during model pretraining) (e.g., 305 of FIG. 3A). The nearest neighbor search component 970 may first identify coreset samples (e.g., 430 of FIG. 4) that are nearest or closest to the patch features extracted from a test image. This involves computing the distances between each test patch feature and the entire set of coreset samples, and identifying those with the shortest distances. After determining the closest coreset sample for each patch feature, the component aggregates these individual distances to create an anomaly score (e.g., 435 of FIG. 4) for the test image. The anomaly score may quantify the overall deviation of the test image from the established "normal" state, and therefore provide an indication of the likelihood that the test image is abnormal and/or contains anomalies. The higher the score, the more likely that the test image is abnormal and/or contains anomalies. In some aspects, the outlier scores of the nearest coreset samples (e.g., 390-2 of FIG. 4) may be incorporated into the computation of the anomaly score. For example, in some aspects, the coreset samples may not be treated equally when determining the anomaly score for a test image. Instead, the distance between a patch feature and its nearest coreset sample may be adjusted by the outlier score associated with that coreset sample.

In the illustrated example, the storage 915 may include the coreset samples 975, the outlier scores 980 associated with these coreset samples, and the historical anomaly scores 985 generated for test images. In some aspects, the aforementioned data may be saved in a remote database (e.g., 125 of FIG. 1) that connects to the computing device 900 via a network.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

receiving a plurality of normal images;

generating, using an outlier detection model, a subset of the plurality of normal images by removing one or more of the plurality of normal images that are determined to have a first outlier score that meets a first criteria;

generating a plurality of patch features by processing the subset of the plurality of normal images;

transmitting the plurality of patch features to a patch feature projection module;

projecting, based on utilizing a patch feature projection module, the plurality of patch features into a shared featured space;

generating a coreset comprising one or more coreset samples, wherein the one or more coreset samples are selected from the plurality of patch features;

generating a subset of the plurality of patch features by removing one or more of the plurality of patch features that have a second outlier score that meets a second criteria, wherein the second outlier score is determined based on determining a local density deviation of a patch feature, of the plurality of patch features, with respect to a neighboring patch feature within the plurality of patch features;

receiving a test image, wherein the test image is generated based on using ultrasonic waves emitted by a testing component;

generating one or more test patch features by processing the test image;

generating an anomaly score by comparing the one or more test patch features with the one or more coreset samples; and highlighting, based on the generated anomaly score, portions of the test image, indicating a likelihood of an anomaly.

2. The method of claim 1, further comprising dividing the plurality of normal images into a plurality of sections, wherein each section of the plurality of sections comprises a sub-region of a normal image within the plurality of normal images.

3. The method of claim 1, further comprising generating an outlier probability for the plurality of normal images, comprising:

dividing the plurality of normal images into a plurality of groups, wherein each group comprises an equal number of the normal images;

designating a first group of the plurality of groups as a validation dataset, and remaining groups of the plurality of groups as a training dataset;

training an outlier detection model on the training dataset; and generating the outlier probability for each image within the validation dataset based on a validation performed by the trained outlier detection model.

4. The method of claim 1, wherein the outlier score for the plurality of patch features is calculated using a density-based method.

5. The method of claim 1, wherein each respective coreset sample, within the one or more coreset samples, is stored into a database along with a respective outlier score.

6. The method of claim 1, wherein the anomaly score is weighted by outlier scores associated with the one or more coreset samples.

7. The method of claim 1, further comprising dividing the test image into a plurality of test sections, wherein the plurality of test sections corresponds to a respective section within the plurality of normal images.

8. The method of claim 1, wherein the highlighting comprises different types of highlighting for different levels of likelihood of the anomaly.

9. The method of claim 1, wherein the highlighting includes a heat map.

10. The method of claim 1, further comprising:

providing a user interface element related to output of the generated anomaly score.

11. The method of claim 1, wherein the one or more coreset samples are selected from the plurality of patch features using a clustering model.

12. The method of claim 11, wherein the clustering model divides the plurality of patch features into one or more clusters, and the one or more coreset samples comprises centroids within the one or more clusters.

13. A system comprising:

one or more memories collectively storing computer-executable instructions; and one or more processors configured to collectively execute the computer-executable instructions and cause the system to:

receive a plurality of normal images;

generate, using an outlier detection model, a subset of the plurality of normal images by removing one or more of the plurality of normal images that are determined to have a first outlier score that meets a first criteria;

generate a plurality of patch features by processing the subset of the plurality of normal images;

transmit the plurality of patch features to a patch feature projection module;

project, based on utilizing a patch feature projection module, the plurality of patch features into a shared featured space;

generate a coreset comprising one or more coreset samples, wherein the one or more coreset samples are selected from the plurality of patch features;

generate a subset of the plurality of patch features by removing one or more of the plurality of patch features that have a second outlier score that meets a second criteria, wherein the second outlier score is determined based on determining a local density deviation of a patch feature, of the plurality of patch features, with respect to a neighboring patch feature within the plurality of patch features;

receive a test image, wherein the test image is generated based on using ultrasonic waves emitted by a testing component;

generate one or more test patch features by processing the test image;

generate an anomaly score by comparing the one or more test patch features with the one or more coreset samples; and highlighting, based on the generated anomaly score, portions of the test image, indicating a likelihood of an anomaly.

14. The system of claim 13, wherein the computer-executable instructions, when executed by the one or more processors, further cause the system to divide the plurality of normal images into a plurality of sections, wherein each section of the plurality of sections comprises a sub-region of a normal image within the plurality of normal images.

15. The system of claim 13, wherein the computer-executable instructions, when executed by the one or more processors, further cause the system to generate an outlier probability for the plurality of normal images, comprising:

dividing the plurality of normal images into a plurality of groups, wherein each group comprises an equal number of the normal images;

designating a first group of the plurality of groups as a validation dataset, and remaining groups of the plurality of groups as a training dataset;

training an outlier detection model on the training dataset; and generating the outlier probability for each image within the validation dataset based on a validation performed by the trained outlier detection model.

16. The system of claim 13, wherein the outlier score for each of the plurality of patch features is calculated using a density-based method, which evaluates a local density deviation of a patch feature with respect to a neighboring patch feature within the plurality of patch features, and the outlier score for the patch feature is determined based on the local density deviation.

17. The system of claim 13, wherein each respective coreset sample, within the one or more coreset samples, is stored into a database along with a respective outlier score.

18. The system of claim 13, wherein the one or more coreset samples is selected from the plurality of patch features using a clustering model, and wherein the clustering model divides the plurality of patch features into one or more clusters, and the one or more coreset samples comprises centroids within the one or more clusters.

19. The system of claim 13, wherein the anomaly score is weighted by outlier scores associated with the one or more coreset samples.

20. One or more non-transitory computer-readable media containing, in any combination, computer program code that, when executed by operation of a computer system, performs an operation comprising:

receiving a plurality of normal images;

generating, using an outlier detection model, a subset of the plurality of normal images by removing one or more of the plurality of normal images that are determined to have a first outlier score that meets a first criteria;

generating a plurality of patch features by processing the subset of the plurality of normal images;

transmitting the plurality of patch features to a patch feature projection module;

projecting, based on utilizing a patch feature projection module, the plurality of patch features into a shared featured space;

generating a coreset comprising one or more coreset samples, wherein the one or more coreset samples are selected from the plurality of patch features;

generating a subset of the plurality of patch features by removing one or more of the plurality of patch features that have a second outlier score that meets a second criteria, wherein the second outlier score is determined based on determining a local density deviation of a patch feature, of the plurality of patch features, with respect to a neighboring patch feature within the plurality of patch features;

receiving a test image, wherein the test image is generated based on using ultrasonic waves emitted by a testing component;

generating one or more test patch features by processing the test image;

generating an anomaly score by comparing the one or more test patch features with the one or more coreset samples; and highlighting, based on the generated anomaly score, portions of the test image, indicating a likelihood of an anomaly.

* * * * *